United States Patent [19]

Hanyu et al.

[11] 4,345,196
[45] Aug. 17, 1982

[54] SPEED CONTROL DEVICE FOR SEWING MACHINES

[75] Inventors: Susumu Hanyu; Yoshinobu Tonomura; Kazuo Watanabe, all of Hachioji, Japan

[73] Assignee: Janome Sewing Machine Co., Ltd., Tokyo, Japan

[21] Appl. No.: 102,324

[22] Filed: Dec. 10, 1979

[30] Foreign Application Priority Data

Dec. 29, 1978 [JP] Japan .......................... 53-182651[U]

[51] Int. Cl.³ .............................................. H02P 5/16
[52] U.S. Cl. ............................. 318/812; 318/345 H; 318/441; 112/275
[58] Field of Search ................... 318/812, 441, 345 D, 318/345 H, 345 E; 307/72, 75, 140, 143, 252 B, 326, 252 UA; 250/551; 112/275

[56] References Cited

U.S. PATENT DOCUMENTS

| | | | |
|---|---|---|---|
| 3,636,379 | 1/1972 | Moe et al. ........................ | 307/252 B |
| 3,648,077 | 3/1972 | Evalds ............................. | 307/252 B |
| 3,665,219 | 5/1972 | Teske .............................. | 307/252 B |
| 3,705,990 | 12/1972 | Pileckis ........................... | 307/252 B |
| 3,940,634 | 2/1976 | Grogan ........................... | 307/252 UA |
| 4,123,113 | 10/1978 | White et al. ...................... | 307/140 |
| 4,229,669 | 10/1980 | Smith .............................. | 307/252 UA |

*Primary Examiner*—David Smith, Jr.
*Assistant Examiner*—G. Z. Rubinson
*Attorney, Agent, or Firm*—Michael J. Striker

[57] ABSTRACT

An electric sewing machine has an A.C. driving motor controlled by a triac; a controlling circuit for the triac includes a thyristor powered by a lower-voltage battery via an adjustable RC-circuit; the controlling circuit is electrically insulated from the A.C. power-supply circuit by an optoelectric coupler, the optical part of which is connected to the A.C. circuit and the electric part of which controls the gate of the thyristor in synchronism with the A.C. voltage; the thyristor in the controlling circuit is coupled to the triac by means of an insulating pulse transformer.

4 Claims, 2 Drawing Figures

Fig_1
PRIOR ART
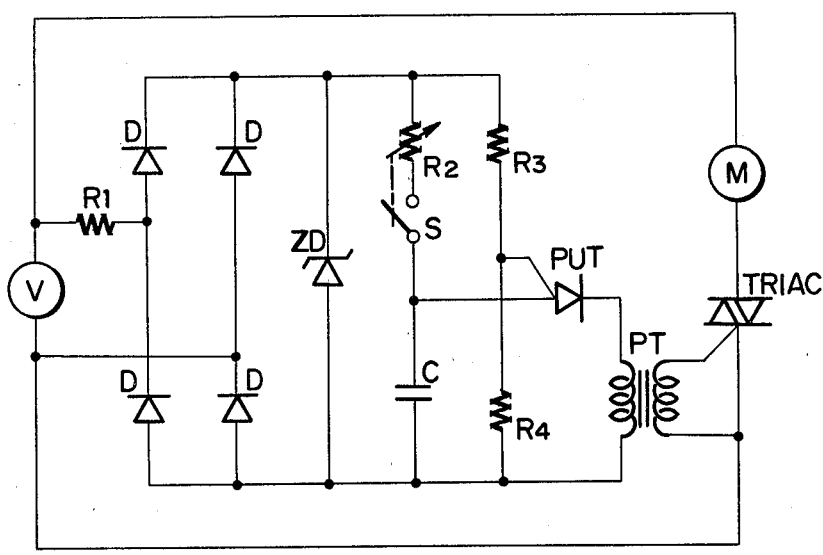
Fig_2
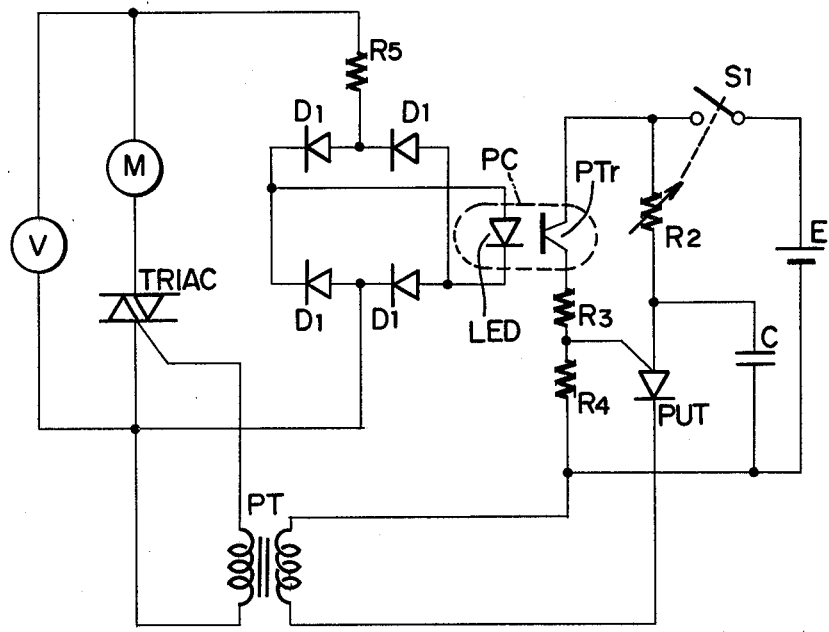

SPEED CONTROL DEVICE FOR SEWING MACHINES

BRIEF DESCRIPTION OF THE INVENTION

The present invention relates to a speed control device for an electric motor, particularly for a drive motor of a sewing machine, in which the power supply of the machine motor and the control part thereof are electrically separated by means of an easily insulating member such as a pulse transformer, and a battery is used as a power source of the control part so that the control part is electrically insulated from the motor power supply. Thus the insulation of a pedal controller is simplified to prevent dangers such as electric shock of the machine operator.

A conventional device for speed control of the sewing machine motor is as shown in FIG. 1 of the attached drawing. According to the conventional device, the machine motor M receives AC power source V and is phase controlled by a bidirectional three-terminal thyristor TRIAC. The full-wave rectifier bridge circuit D-D receives AC power source V and constitutes, together with the Zenor diode ZD, a trapezoidal wave voltage source for controlling the trigger current of the thyristor TRIAC. The N-gate thyristor PUT receives at its anode the charged voltage of the capacitor C to be charged with the trapezoidal wave-voltage source via the variable resistor R2 for controlling ignition phase of the anode, and is operated to discharge the charged voltage of the capacitor at the side of the primary coil of the pulse transformer PT. The switch S is operated in association with the resistance control of the variable resistor R2 and is opened at the maximum value of said resistor and is closed in the other condition.

The gate of the thyristor PUT receives the trapezoidal wave voltage divided by the resistors R3, R4. The secondary coil of the pulse transformer PT constitutes a gate trigger circuit of the bidirectional thyristor TRIAC. If the switch S is closed and as the value of variable resistor R2 is reduced, the anode voltage of N-gate thyristor PUT has a point exceeding the gate voltage as the voltage of the capacitor increases in a constant voltage period of each of the trapezoidal waves. N-gate thyristor PUT is ignited at the phase of this point, and the voltage of the capacitor C is abruptly discharged via the pulse transformer PT, and the bidirectional thyristor TRIAC is thereby ignited. Once the capacitor C discharges, it starts charging instantly, and sometimes repeatedly discharges several times in the same trapezoidal wave due to the operation of the N-gate thyristor PUT. Then the subsequent discharge gives no influence to the bidirectional thyristor TRIAC, which has already been ignited. In the vicinity at the termination of the wave after the constant voltage period of the same trapezoidal wave, the anode voltage exceeding the gate voltage ignites, in the same manner, the N-gate thyristor PUT to cause the capacitor C to discharge, thereby to make in agreement with the rising point of the subsequent trapezoidal wave and a starting point of the charging of the capacitor C. The output of the pulse transformer PT by the discharge at this time is set so as not to newly ignite the bidirectional thyristor TRIAC. On the other hand, if the value of the variable resistor R2 is reduced, the rising curve of the charged voltage of the capacitor C is made steep to ignite the N-gate thyristor PUT at a more advanced phase. Since the ignited phase of the bidirectional thyristor coincides with said advanced phase, the motor M is controlled at a large conductive angle and the rotation of the motor is increased.

The present invention has been provided to eliminate the defects and disadvantages of the prior art. It is a primary object of the invention to dispose an insulating treatment at the controlling part of the device for securing the safety or the operator precluding the danger of electric shock.

The other features and advantages of the invention will be appareant from the following description of the invention in reference to the preferred embodiment as shown in the attached drawing.

BRIEF DESCRIPTION OF THE DRAWING

FIG. 1 shows a speed control circuit of machine motor according to the prior art, and FIG. 2 shows a speed control circuit of machine motor according to the present invention.

DETAILED DESCRIPTION OF THE INVENTION

The present invention will be explained in reference to FIG. 2 of the attached drawing, in which the elements indicated by the same letters as in FIG. 1 have the same objects and functions. Therefore, the explanation of these elements is not repeated, and only the different parts will be discussed. In FIG. 2, PC is a photocoupler including a light emitting diode LED and a phototransistor PTr. The light emitting diode LED receives the power source voltage V which is rectified by the intermediate full wave rectifying circuit of diodes D1-D1, and the phototransistor PTr opens and closes a battery voltage E relative to the gate of N-gate thyristor PUT. This gate receives the battery voltage E divided by the resistors R3, R4. The phototransistor PTr is so set as to saturate the collector current with a quantity of light more than a certain level. Thus the trapezoidal wave current flows through the resistors R3, R4 in both sides of the power source V, and the gate voltage of N-gate thyristor PUT becomes a trapezoidal wave in synchronism with the power source V as is in FIG. 1. R5 is a protective resistor. S1 is a switch for opening and closing the battery source E. The switch S1 is opened at the maximum value of the variable resistor R2 and is closed at the other conditions of the variable resistor R2. The variable resistor R2 is controlled by operation of the pedal controller (not shown) so as to control the inclination of the rising curve of the charged voltage of the capacitor C which is charged with the battery voltage E. The control circuit in FIG. 2 trigers, by means of the DC voltage E, the bidirectional thyristor TRIAC receiving AC source at its anode. Since the trigger current is controlled in synchronism with the AC source V, the same control effect can be obtained as is in FIG. 1. Since the electric potentials of the resistor R2 and the switch S in FIG. 1 receive the AC source V (e.g., 100 V), a countermeasure for the electric shock is required, and the insulation of the casing of the controller generally requires a technique of high quality. On the other hand, since the resistor R2 and the switch S1 shown in FIG. 2 are insulated by the pulse transformer TR and receive only a small amount of voltage (e.g., 6 or 7 voltage) from the battery source E only, there is no danger of electric shock and the insulation may be so simplified. The control of the circuit in FIG. 2 is effected by the bidirectional thyristor TRIAC. Instead, the control may be effected by a reverse blocking thyristor. In this case a diode is provided in series to the gate, and the lighting emitting diode LED is connected to the resistor R and to the cathode of the reverse blocking thyristor.

As mentioned above, the present invention employs the battery power source for ignition of the speed control circuit for the machine motor using the commercial AC electric source, thereby to simplify the insulation treatment for the control part of the device precluding the dnager of the electric shock.

We claim:

1. In an electric sewing machine, a combination comprising an A.C. drive motor; an A.C. power supply circuit; a first semiconductor control element connectable to the A.C. power supply circuit and having a control electrode for controlling the phase of the supply current; and a speed control device, comprising a trigger circuit including a separate D.C. power supply circuit, a second semiconductor control element having a control electrode for triggering the same; means for connecting the second control element to the D.C. power supply circuit; and an electrically insulating coupling circuit for coupling said speed control device to said A.C. power supply circuit, said coupling circuit including a pulse transformer connecting the trigger circuit to the control electrode of said first semiconductor control element, and a synchronizing electrooptical coupler having a light-emitting part connected to the A.C. power supply circuit and an electric part connected to the control electrode of said second semiconductor element.

2. A speed control device as defined in claim 1, wherein said trigger circuit includes an RC-circuit connected between said second semiconductor control element and said D.C. power supply circuit and including a variable resistor coupled to said connecting means.

3. A speed control device as defined in claim 1, wherein said first semiconductor control element is a triac and said second semiconductor control element is a thyristor power supplied by a battery.

4. A speed control device as defined in claim 1, wherein said light-emitting part of said electrooptical coupler is connected to said A.C. power supply circuit via a full-wave rectifier.

* * * * *